United States Patent [19]
King et al.

[11] Patent Number: 5,832,253
[45] Date of Patent: Nov. 3, 1998

[54] MULTIPROCESSORS SYSTEM FOR SELECTIVELY WIRE-ORING A COMBINATION OF SIGNAL LINES AND THEREAFTER USING ONE LINE TO CONTROL THE RUNNING OR STALLING OF A SELECTED PROCESSOR

[75] Inventors: Edward C. King, Pleasanton; Alan G. Smith, Dublin; Mark E. Scheitrum, San Jose, all of Calif.

[73] Assignee: CPU Technology, Inc., Pleasanton, Calif.

[21] Appl. No.: 163,442

[22] Filed: Dec. 6, 1993

[51] Int. Cl.$^6$ ...................................................... G06F 13/00
[52] U.S. Cl. .................... 395/553; 395/551; 395/800.01; 395/800.32
[58] Field of Search ...................................... 395/200, 375, 395/725, 775, 551, 553, 800.32, 800.01; 370/55; 364/518

[56] References Cited

U.S. PATENT DOCUMENTS

| | | | |
|---|---|---|---|
| 4,493,053 | 1/1985 | Thompson | 364/900 |
| 4,620,278 | 10/1986 | Ellsworth et al. | 364/200 |
| 4,621,318 | 11/1986 | Maeda | 364/200 |
| 4,663,708 | 5/1987 | Taub | 364/200 |
| 4,750,168 | 6/1988 | Trevitt | 370/85 |
| 4,908,749 | 3/1990 | Marshall et al. | 364/200 |
| 5,046,023 | 9/1991 | Katsura et al. | 364/518 |
| 5,107,420 | 4/1992 | Kametani | 395/650 |
| 5,159,686 | 10/1992 | Chastain et al. | 395/650 |
| 5,222,229 | 6/1993 | Fukuda et al. | 395/550 |
| 5,313,620 | 5/1994 | Cohen et al. | 395/550 |
| 5,355,500 | 10/1994 | Kondou | 395/725 |
| 5,388,262 | 2/1995 | Hillis | 395/650 |
| 5,481,747 | 1/1996 | Kametani | 395/800 |

*Primary Examiner*—Thomas C. Lee
*Attorney, Agent, or Firm*—Townsend and Townsend and Crew LLP

[57] ABSTRACT

The present invention provides for a computer system having a plurality of parallel processor units. The processor units are connected in common to a signal line with each processor capable of setting a first signal level on the line and monitoring the line in response to instructions to the processor. This allows each processor unit to be notified of the completion of a parallel operation by other participating processor units upon a second signal level on the signal line. More than one signal lines may be connected between the parallel processor units to provide synchronization of different parallel operations between different processor units.

20 Claims, 4 Drawing Sheets

SYNCS
SYNCHRONIZATION START

OPCODE DEFINITION:

SYNCE
SYNCHRONIZATION END

OPCODE DEFINITION:

WAIT
WAIT FOR SYNCHRONIZATION

OPCODE DEFINITION:

WAITS
WAIT FOR SYNCHRONIZATION THEN START SYNC

MULTIPROCESSORS SYSTEM FOR SELECTIVELY WIRE-ORING A COMBINATION OF SIGNAL LINES AND THEREAFTER USING ONE LINE TO CONTROL THE RUNNING OR STALLING OF A SELECTED PROCESSOR

BACKGROUND OF THE INVENTION

The present invention is related to the field of computer architecture and organization and, more particularly, to the synchronization of processor units operating in parallel.

A general goal for computers is faster and faster operation. One solution has been to develop individual processor units with higher operating speeds. Other solutions have been to develop computers with multiple processor units operating in parallel. Compared to a computer with a single processor, parallel computers have not had the desired increase in operating speeds as might be expected. As the number of parallel processor units have increased, the interplay between the parallel processors has become much more complex and the marginal increase in operating speeds has fallen.

One of the impediments to high speed parallel processing has been that the synchronization between processor units has been slow. Synchronization between parallel processor units is a requirement in parallel processor computers to keep one unit from getting too far ahead (or behind) the other units. For example, parallel processor units typically receive data processed by other units to continue processing. Synchronization forces the parallel units to stay in step with each other and not outrun the required data.

In the older mainframe computers, synchronization between processing units has been performed through interrupt techniques. Typically, these interrupt sequences have taken hundreds of clock cycles as each interrupt requires the acceptance of an interrupt signal and the fetching and execution of an interrupt program sequence. Recent parallel processors have used memory techniques for synchronization to significantly reduce the time to synchronize processors. Particular memory locations are designated as semaphores to indicate the status of parallel operations. Typically this technique has required tens of clock cycles as reading and writing operations are involved. Even more recent synchronization have used interlocks between processors which typically require a few clock cycles.

The present invention offers a synchronization technique so that processor units operating in parallel can synchronize their operations in a single clock cycle.

SUMMARY OF THE INVENTION

The present invention provides for a computer system having a plurality of parallel processor units. The processor units are connected in common to a signal line with each processor capable of setting a first signal level on the line and monitoring the line in response to instructions to the processor. This allows each processor unit to be notified of the completion of a parallel operation by other participating processor units upon a second signal level on the signal line. More than one signal lines may be connected between the parallel processor units to provide synchronization of different parallel operations between different processor units.

The present invention also provides for a method of synchronizing operations between parallel processor units in a computer system. The processor units are connected in common to a line with each processor unit capable of setting a first signal level on the line and monitoring the line in response to instructions to the processor. The method comprises the steps of instructing each processor unit handling related operations to set the line; instructing each processor unit handling the related operations to release the line upon completion of its related operation; and instructing each processor unit to monitor the line to determine completion of related operations by a second signal level on the line. This allows the processor units handling said related operations to be synchronized at the completion of the related operations.

BRIEF DESCRIPTION OF THE DRAWINGS

A clearer understanding of the present invention may be achieved by a perusal of the following description of specific embodiments with reference to the following drawings.

DESCRIPTION OF PREFERRED EMBODIMENT(S)

Figure 1:
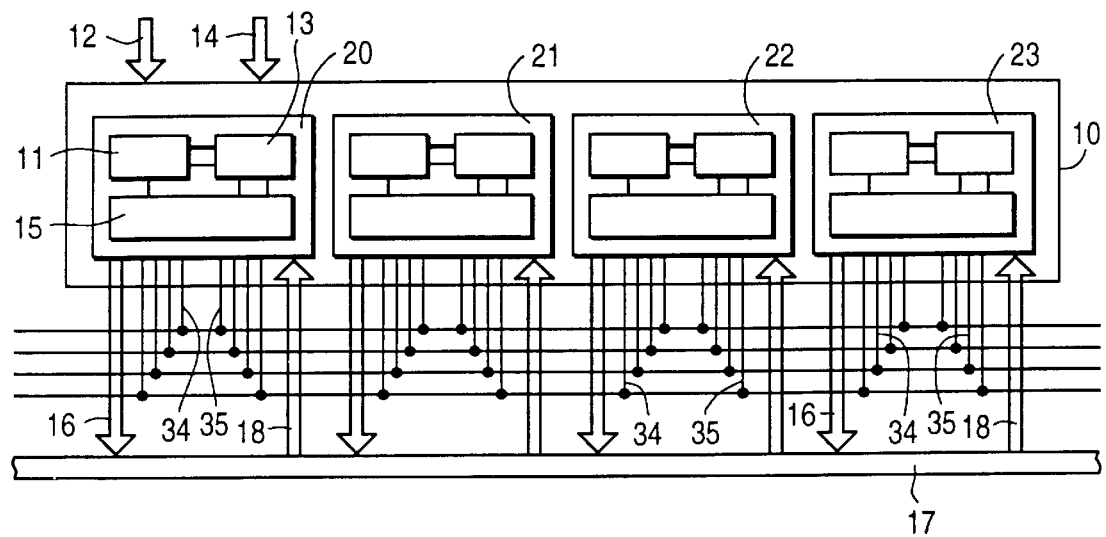
FIG. 1 is a block diagram of an integrated circuit having multiple processor units implementing the present invention.

FIG. 1 is a block diagram of four processor units 20–23 which are connected in parallel, which are part of an integrated circuit 10. Each processor unit has an instruction unit 11 which receives instructions on a instruction path 12, a set 13 of registers which receives data from a data path 14, and an execution unit 15 which executes the instruction in accordance with the control signals from the instruction unit 11.

Each of the processor units 20–23 is connected to memory by data paths 16 and 18. For the purposes of explaining the present invention, the data paths 16 and 18 are connected to a memory bus 17, which is, in turn, connected to main memory (not shown).

The processor units 20–23 are each connected to four signal lines 30–33 as shown in FIG. 1. Each processor unit 20–23 is connected to each signal line 30–33 by a line 34 which can set the signal level of the signal line and a second line 35 which can monitor the signal level of the signal line.

Each of the signal lines 30–33 is also connected to input/output pins 40 (shown in FIG. 3) of the integrated circuit 10. Thus several of the integrated circuits 10 may be coupled in parallel so that the processors 20–23 in each integrated circuit 10 are connected in parallel and that each processing unit 20–23 in each integrated circuit 10 is connected in common to each of the signal lines 30–33. The integrated circuits 10 may be connected together to create a computer having 4 by N processor units, where N is the number of integrated circuits.

Figure 2:
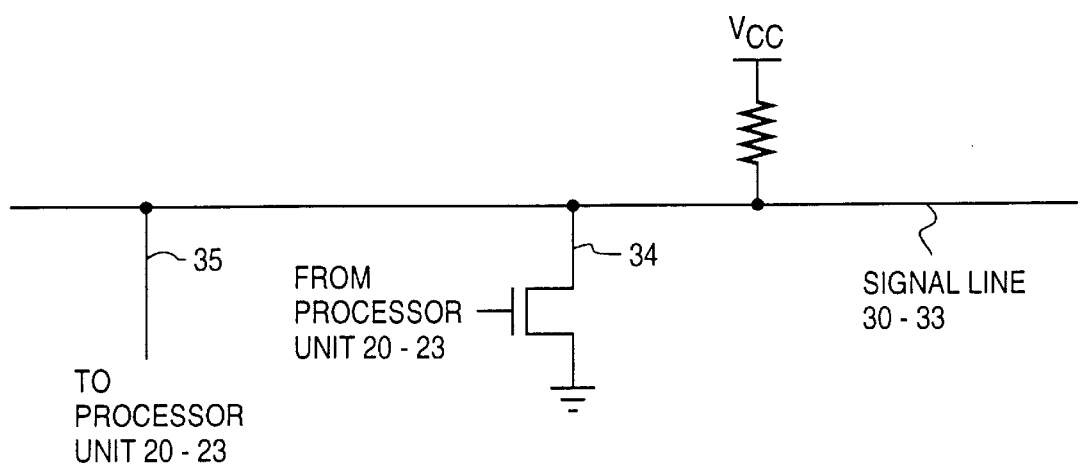
FIG. 2 is a diagram illustrating the connection of processor unit to a signal line in FIG. 1.

With respect to each processor unit 20–23, its connection to the signal lines 30–33 operates in a wired-OR configuration, as shown in FIG. 2. That is, each of the signal lines 30–33 operates as if it were coupled to a high voltage supply, $V_{cc}$, through a resistor and each processor 20–23 is connected to each signal line 30–33 by a transistor having its drain connected through the signal line and its source connected to a low voltage supply, ground. Any one of the processors 20–23 can set any one of the signal lines 30–33 to ground. If none of the processors 20–23 have set a signal line, the signal line 30–33 is nominally at the high voltage supply, $V_{cc}$.

Each processor unit 20–23 can also monitor each of the signal lines 30–33 to determine its state, i.e., whether the signal line is near ground or at $V_{cc}$.

Figure 3:
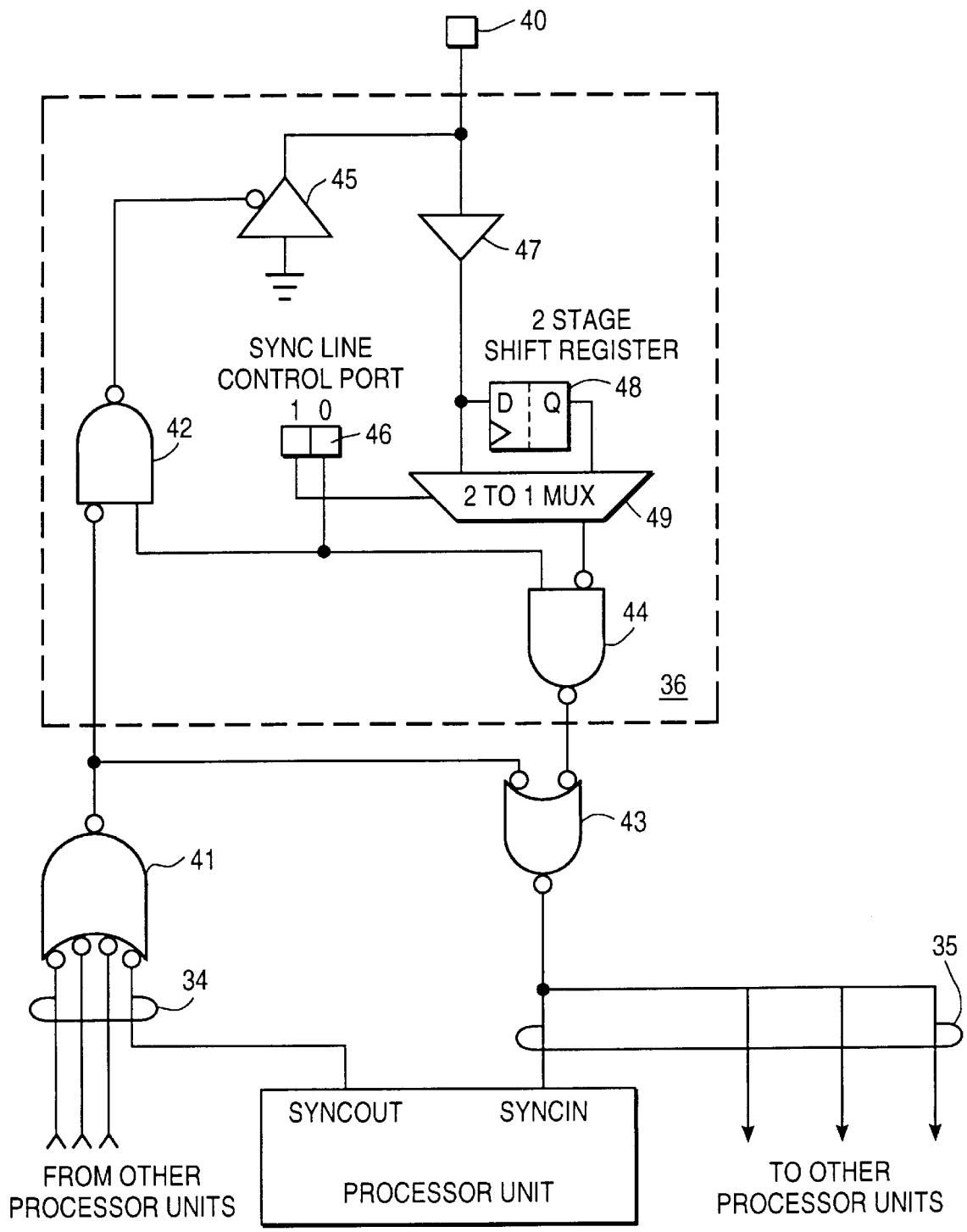
FIG. 3 is a logic diagram of the connection of the processing units to the signal lines in FIG. 1.

In fact, each of the processor units 20–23 in the integrated circuit 10 is connected to each of the signal lines 30–33 by a logic circuit illustrated by the diagram of FIG. 3. As shown in FIG. 3, there are no physical lines for the signal lines 30–33 running across the integrated circuit 10. Rather, each line 30–33 is a combination of logic gates arranged so that each of the processor units 20–23 can communicate with each other and with other integrated circuits.

Each processor unit 20–23 is connected by its respective output line 34, which can set one of the signal lines 30–33, to an inverting input terminal of a NOR logic gate 41. Likewise, each processor unit 20–23 is connected by its respective input line 35, which monitors one of the signal lines 30–33, to an output terminal of a NOR logic gate 43. The output terminal of the NOR logic gate 41 is connected to one inverted input terminal of the NOR logic gate 43.

The output terminal of the gate 41 is also connected to an inverting input terminal of a NAND logic gate 42, which is part of an external signal synchronization block 36. The block 36, delineated by a dotted line and formed by buffers 45 and 47, registers 46 and 48, a multiplexer 49 and a NAND logic gate 44, selectively allows synchronization of an external signal on the signal lines 30–33 when the signal lines are connected to other integrated circuits through the input/output pin 40. Such synchronization is necessary when the signal delay caused by the external capacitive loading on the signal lines 30–33 is such that the incoming signal does not meet the setup time requirements with respect to the receiving processor unit's clock, or when the external source of the incoming signal is asynchronous to the receiving processor unit's clock.

Synchronization selection is made by loading a value under program control into a control port, the two-bit register 46. A value of x,0 disengages the NAND gate 42 and the external signal synchronization block 36 so that the synchronization signals remain internal to the integrated circuit 10. A signal on one of the lines 34 is fed back from the NOR gate 41 back through the NOR gate 43 to the lines 35 to each of the processor units 20–23. A value of 0,1 engages the external signal synchronization block 36 so that a synchronization signal from the processor units 20–23 can be driven externally through the pin 40 by the input-grounded buffer 45. The synchronization signal is passed back with no delay to the processor units 20–23 of the integrated circuit through the buffer 47, through the multiplexer 49 (bypassing the shift register 48) and the NAND gate 44 and NOR gate 43 to the synchronization monitoring line 35 to each of the processor units 20–23.

A value of 1,1 in the register 46 engages the external signal synchronization block 36 for external synchronization and the two-stage shift register 48 to guarantee that the incoming signal meets the required setup time with respect to the processor unit's clock. Clock synchronization is accomplished by passing the incoming signal into the clock synchronizing shift register 48 and using a two-to-one multiplexer 49 to select the output of the shift register 48 (two flip-flops) for a delay of two clock cycles.

Functionally, the units 20–23 operate in the wired-OR fashion as described above. When the integrated circuits 10 are connected in parallel or the signal lines 30–33 of an integrated circuit are connected to a signalling device, as described below, each of the lines 30–33 are connected to a high voltage reference through a resistive coupling shown in FIG. 2. This arrangement eases the burden of pulling up the increased external load on the coupled signal lines 30–33.

The processor units 20–23 have an instruction set which includes the four synchronization instructions shown in FIG. 4A–4D. Synchronization Start instruction of FIG. 4A, SYNCS, asserts, or sets, any of the signal lines 30–33. The four-bit immediate field at the end of the instruction opcode determines which signal lines to assert. A processor unit executing that instruction pulls the indicated signal line or lines low and continues instruction execution.

Figure 4A:
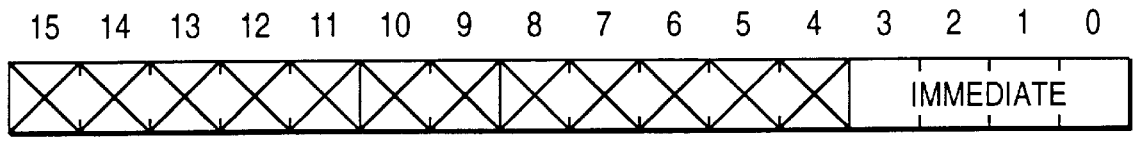
FIG. 4A–4D lists the opcode of exemplary synchronization instructions for the processor units of FIG. 1.
Figure 4B:
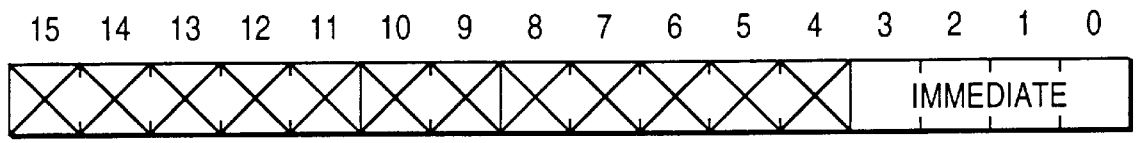

The Synchronization End instruction, SYNCE, releases signal line or lines 30–33 indicated by the four-bit immediate field in the opcode as shown in FIG. 4B. The processor unit 20–23 continues executing instructions after deasserting the indicated signal lines 30–33. That is, in the next clock cycle after releasing the signal line or lines, the processor executes its next instruction.

Figure 4C:
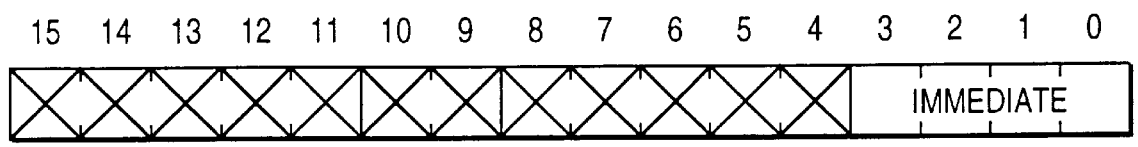

FIG. 4C shows the Wait For Synchronization instruction, WAIT, listing. The processor unit 20–23 executing the WAIT instruction deasserts the signal line or lines 30–33 indicated in the four-bit immediate field at the end of the opcode. During the same clock cycle, the processor unit checks the indicated signal line or lines 30–33 to determine whether those lines remain set, or asserted. If so, the processor unit stalls and the processor units checks the indicated signal lines 30–33 at each cycle thereafter. The processor unit remains stalled until the indicated signal line, or lines, 30–33 is released.

Figure 4D:
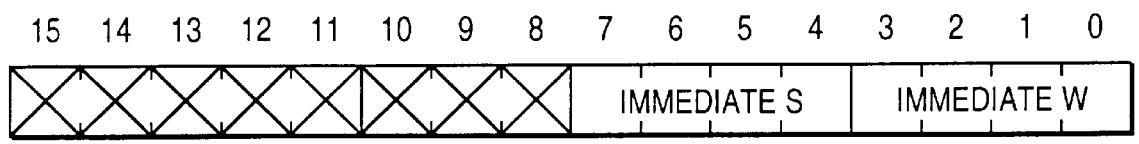

The last synchronization instruction is Wait For Synchronization Then Start Sync, or WAITS. As shown in FIG. 4D, the opcode of this instruction has two four-bit immediate fields, immediate W and immediate S. The processor unit executing this instruction deasserts and checks the signal line or lines 30–33 indicated by the immediate W field. If one or more of the indicated lines remains asserted, the processor stalls. Thereafter the processor unit checks the indicated signal lines at every clock cycle. When the signal lines indicated by the immediate W field are released, the processor unit then sets the signal lines 30–33 indicated by the immediate S field.

Figure 5:
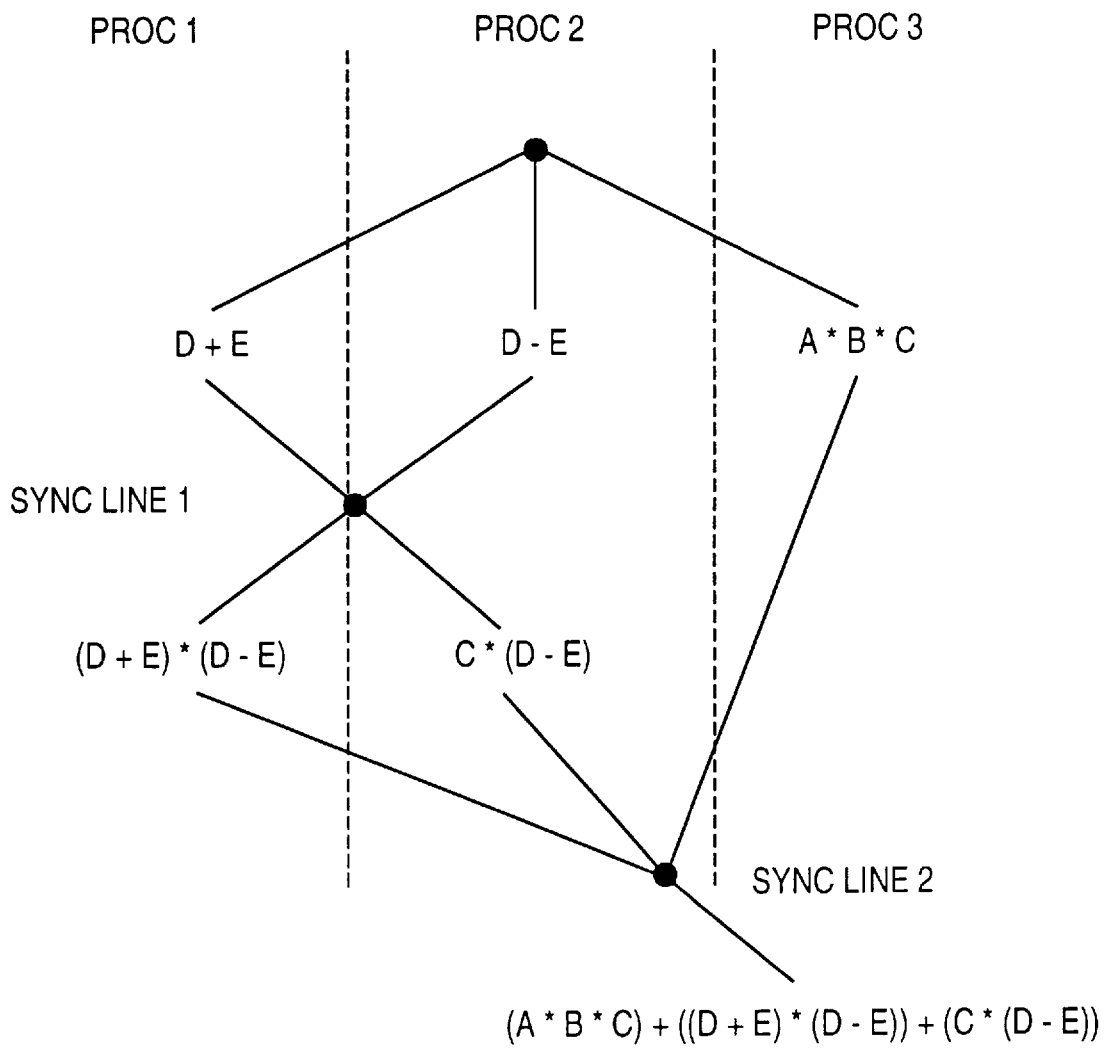
FIG. 5 is an exemplary program listing which shows the synchronization according to the present invention.

FIG. 5 shows how some of these synchronization instructions for the parallel processor units 20–23 are used in a simple program. Three of the processor units 20–23 are used with two of the signal lines 30–33 to synchronize operations with each other. The formula $$X=(A*B*C)+((D+E)*(D-E))+(D*(D-E))$$

is calculated. FIG. 5 illustrates the operations of the each of the processor units, proc 1, proc 2 and proc 3, separated by dotted lines. Program operation flow is from top to bottom.

Proc 1, Proc 2 and Proc 3 run the following instruction code:
Proc 1
    SYNCS $3_2$
    D+E→T3
    WAIT $1_2$
    T3*T4→T5
    WAIT $2_2$
Proc 2
    SYNCS $3_2$
    D-E→T4

```
SYNCE 1₂
C*T4→T6
WAIT 2₂
Proc 3
SYNCS 2₂
A*B→T1
T1*C→T2
WAIT 2₂
T5+T6→T7
T7+T2→X
``` where T1–T7 are register locations, and the numerical notation at the end of the SYNCS, SYNCE and WAIT instructions refers to the binary notation in the four-bit immediate field of the synchronization instruction. For example, SYNCS $3_2$ indicates that the immediate field of the Synchronization Start instruction should be 0011, i.e., 3 in common decimal notation. Thus the program in FIG. 5 uses two signal lines, termed Sync Line 1 and Sync Line 2, which are indicated by the two least significant places in the four-bit immediate field of the SYNCS, SYNCE and WAIT instructions.

Up to now, the signal lines 30–33 have been shown as being connected to other processor units 20–23. It should be noted, however, that the signal lines may be connected to other types of electronic units or devices. For example, the signal lines 30–33 may be connected to a video device which transmits an intermittent signal, such as a frame signal. Such a signal could be used to periodically synchronize the digital signal processing of the video image by the connected processor units 20–23 in one or more integrated circuits 10. Similarly, the signal lines 30–33 may be connected to an input/output port for the synchronized processing of data by the connected processor units.

For a better understanding of the synchronization instructions discussed above, the following lists the instructions by their mnemonic, the drawing illustrating the instruction's referenced opcode, and the definition of the instruction:

SYNCS (Synchronization Start), FIG. 4A

This instruction asserts the synchronization lines specified by the Immediate field. A one bit indicates a line to assert. The processor continues instruction execution following SYNCS.

SYNCE (Synchronization End), FIG. 4B

Deasserts synchronization lines specified by the Immediate field. A one bit in the four bit immediate field indicates a line to deassert. The processor continues instruction execution following SYNCE.

WAIT (Wait For Synchronization), FIG. 4C

This instruction causes the processor to deassert and then check the synchronization lines specified by the four bit immediate field. If a line indicated by a one bit in the immediate field is asserted, the processor will stall. The synchronization lines are checked every cycle. While waiting, the processor will acknowledge and take any interrupts as determined by the MSW.

WAITS (Wait For Synchronization Then Start Sync), FIG. 4D

This instruction causes the processor to deassert and then check the synchronization lines specified by the four bit immediate first operand. If a line indicated by a one bit in the immediate field is asserted, the processor will stall.

The synchronization lines are checked every cycle. While waiting, the processor will acknowledge and take any interrupts as determined by the MSW. Once the synchronization lines indicated by the first operand are deasserted, the processor than asserts the synchronization lines indicated by the second four bit immediate operand. The WAITS instruction is an atomic WAIT and SYNCS operation, such that interrupts are not recognized following the release of the synchronization lines and prior to the reassertion of the synchronization lines.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A computer system having a plurality of processor units, each processor unit connected to other processor units for parallel and independent processing, each processor unit processing instructions having no required relationship to instructions processed in other processor units, each of said processor units connected in common to a plurality of signal lines and directly responsive to instructions so as to be capable of setting a first signal level on a combination of said lines, monitoring at least one of said combination of said lines for a second signal level, and stalling or continuing processing in response to said second signal level on said one of said combination of said lines so that said processor units are selectively synchronized with other processor units through said one of said combination of said lines.

2. A computer system as in claim 1 wherein said processor units are connected in common to four signal lines.

3. A computer system as in claim 1 wherein said signal line is connected to at least one electronic unit, not a processor unit, said electronic unit transmitting an intermittent signal for synchronization with at least some of said processor units.

4. A computer system as in claim 3 wherein said intermittent signal comprises a video signal.

5. A computer system as in claim 4 wherein said video signal comprises a frame signal.

6. A computer system as in claim 3 wherein said electronic unit comprises an input/output port.

7. A computer system as in claim 1 wherein said line is nominally at said second signal level, each processor unit sets said line to said first signal level and releases said line responsive to instructions, said signal line returning to said second signal level when all processor units release said line.

8. A computer system as in claim 7 wherein said line is resistively coupled to a first voltage supply, and each processor unit sets said line by connecting said line to a second voltage supply.

9. A computer system as in claim 1 wherein each of said processor units is capable of setting said signal line in response to an execution of a first computer instruction and continues instruction execution.

10. A computer system as in claim 9 wherein each of said processor units is capable of releasing said signal line in response to an execution of a second computer instruction and continuing instruction execution.

11. A computer system as in claim 9 wherein each of said processor units is capable of releasing said signal line in response to an execution of a third computer instruction and monitoring said signal line to determine whether said line remains set, said processor unit stalling until said signal line is released.

12. A computer system as in claim 9 wherein each of said processor units is capable of releasing said signal line in response to an execution of a fourth computer instruction and monitoring said signal line to determine whether said line remains set, said processor unit stalling until said signal line is released, said processor unit resetting said signal line when said signal line is released and continuing instruction execution.

13. A computer system as in claim 1 wherein each of said processor units is capable of setting any one or combination of said signal lines in response to an execution of a first computer instruction designating said one or combination of said signal lines and continuing instruction execution thereafter.

14. A computer system as in claim 13 wherein each of said processor units is capable of releasing any one or combination of said signal lines in response to an execution of a second computer instruction designating said one or combination of said signal lines and continuing instruction execution thereafter.

15. A computer system as in claim 13 wherein each of said processor units is capable of releasing any one or combination of said signal lines in response to an execution of a third computer instruction designating said one or combination of said signal lines and monitoring said one or combination of signal lines to determine whether said one or combination of signal lines remain set, said processor unit stalling until said one or combination of signal lines are released.

16. A computer system as in claim 13 wherein each of said processor units is capable of releasing any one or combination of said signal lines in response to an execution of a fourth computer instruction designating said one or combination of said signal lines and monitoring said one or combination of said signal lines to determine whether said one or combination of said signal lines remain set, said processor unit stalling until said one or combination of signal lines are released, said processor unit resetting one or any combination of signal lines when said one or combination of signal lines are released and continuing instruction execution.

17. In a computer system having a plurality of processor units, each processor unit connected for parallel and independent processing of instructions having no required relationship to instructions processed in other processor units, each processor unit connected in common to a plurality of signal lines and capable of setting a first signal level on each of said lines and monitoring said each of said lines in response to instructions to said processor, a method of synchronizing operations between said processor units comprising:

directly instructing each processor unit processing a set of related operations to set one of said lines, including instructing at least one processor unit processing a plurality of related operation sets to set a plurality of said lines;

directly instructing each processor unit processing a set of related operations to release a line upon completion of its set of related operations; and directly instructing at least one of said processor units to monitor said line to determine completion of said set of related operations, and to stall or to continue processing responsive to a second level on said line so that said processor units handling said set of related operations are selectively synchronized at the completion of said set of related operations.

18. The method of synchronizing operations between said processor units of claim 17 wherein said parallel processor units are connected in common to a plurality of signal lines, each processor capable of setting a first signal level on each of said lines and monitoring each of said lines in response to instructions to said processor, further comprising instructing each processor unit processing a first set of related operations to set a first of said signal lines;

instructing each processor unit processing a second set of related operations to set a second of said signal lines;

instructing each processor unit processing said first set of related operations to release said first signal line upon completion of its related operation;

instructing at least one of said processor units processing said first set of related operations to monitor said first signal line to determine completion of said first set of related operations, and to stall or to continue processing responsive to a second level on said first signal line;

instructing each processor unit processing said second set of related operations to release said second signal line upon completion of its related operation;

instructing at least one of said processor units processing said second set of related operations to monitor said second signal line to determine completion of said second set of related operations, and to stall or to continue processing responsive to a second level on said second signal line;

whereby said processor units handling said first and second set of related operations may be selectively synchronized at the completion of each set of said related operations.

19. The method of synchronizing operations between said processor units of claim 17 wherein said signal line is nominally at said second signal level, each processor unit sets said line to said first signal level and releases said line responsive to instructions, said signal line returning to said second signal level when all processor units release said line.

20. The method of synchronizing operations between said processor units of claim 19 wherein a group formed by each processor unit handling said first set of related operations in not mutually exclusive from a group formed by each processor unit handling said second set of related operations.

* * * * *